United States Patent

Ranz et al.

[15] 3,660,093

[45] May 2, 1972

[54] DRY AZIDO THERMAL DIFFUSION COPYING PROCESS

[72] Inventors: Erwin Ranz, Leverkusen; Helmut Kampfer, Cologne-Stammheim; Harald Von Rintelen, Leverkusen; Heinz-Dieter Schutz, Leverkusen; Dietmar Mayer, Leverkusen; Klaus Sasse, Cologne-Stammheim, all of Germany

[73] Assignee: AGFA-Gevaert Aktiengesellschaft, Leverkusen, Germany

[22] Filed: July 2, 1969

[21] Appl. No.: 838,637

[30] Foreign Application Priority Data

July 8, 1968 Germany ......................P 17 72 813.1

[52] U.S. Cl. ....................................96/29 D, 96/3, 96/29 R, 96/49.75, 96/91 N

[51] Int. Cl. ......................G03c 5/54, G03c 5/56, G03c 5/18

[58] Field of Search ................96/29, 49, 75, 90, 91 N, 29 D, 96/3

[56] References Cited

UNITED STATES PATENTS

| | | | |
|---|---|---|---|
| 1,845,989 | 2/1932 | Schmidt et al. | 96/91 N |
| 2,747,999 | 5/1956 | Yutzy et al. | 96/91 X |
| 2,882,151 | 4/1959 | Yutzy et al. | 96/49 X |
| 3,007,795 | 11/1961 | Haydn et al. | 96/91 X |
| 3,062,650 | 11/1962 | Sagura et al. | 96/91 N |
| 3,143,423 | 8/1964 | Reynolds et al. | 96/91 N |
| 3,282,693 | 11/1966 | Sagura et al. | 96/91 UX |
| 3,519,424 | 7/1970 | Reynolds et al. | 96/91 N |

FOREIGN PATENTS OR APPLICATIONS

| | | | |
|---|---|---|---|
| 727,676 | 5/1955 | Great Britain | 96/91 |

OTHER PUBLICATIONS

Kosar, J. "Light-Sensitive Systems," p. 330, 1965.
Dinaburg, M. S., " Photosensitive Diazo Cpds.," p. 175, 1964.

*Primary Examiner*—Charles L. Bowers, Jr.
*Attorney*—Connolly and Hutz

[57] ABSTRACT

Positive copies are produced by a dry heat transfer process, whereby an imagewise exposed light-sensitive layer containing an organic azido compound is heated to transfer the azido compound from the unexposed areas to a reception layer and subsequent reaction to a visible positive image.

2 Claims, No Drawings

DRY AZIDO THERMAL DIFFUSION COPYING PROCESS

The invention relates to a dry transfer process for the production of positive copies and to a light-sensitive photographic material for carrying out the process.

It is known that certain organic azides are light-sensitive, thus, for example, certain organic azides are used for the light-induced cross-linking of polymers. Furthermore, organic azides which decompose on exposure to light into products which in turn react with other compounds (e.g. phenothiazone) to form dyes or to enable oxidative coupling to take place according to the principle of color forming development used in color photography have been described.

The known light-sensitive materials of the above mentioned type which can be used to produce negative copying images are, however, disadvantageous in several respects. Thus, their sensitivity to light is unsatisfactory, so that the necessary copying times for practical purposes are far too long. Moreover, the material containing the final image remain sensitive to light. Stabilization of the finished images to daylight can usually only be achieved by complicated after treatments.

It is among the objects of this invention to provide new copying materials which can be processed by a dry process and which yield copies which are stable to light.

We now have found a dry photographic copying process including the steps of which exposing a light-sensitive material which contains a light-sensitive organic azide compound either in a supported light-sensitive layer or in a self-supporting layer and heating the exposed layer in contact with an image receiving material, the light-sensitive compound which has remained undecomposed in the unexposed areas diffusing over into the image-receiving material where it forms a positive image.

Particularly suitable organic azido compounds are those of the 9-azidobenzacridine, 9-azidoacridine and 4-azido-quinoline series.

The image in the image receiving material consists of a light-sensitive compound and can be made visible by decomposing this compound with formation of colored decomposition products, especially by exposure or preferably by reaction with a reaction component capable of yielding a colored reaction product. According to a preferred embodiment of the invention, these reactants are contained in the image receiving material.

9-Azido-2,3-benzacridine, 4-azidoquinoline and 9-azidoacridine are suitable light-sensitive compounds. These compounds have the same basic structure and differ only by an attached benzene ring. Substitution products of these basic compounds, e.g. those substituted with alkyl which preferably contains up to six carbon atoms, such as methyl, ethyl, propyl or butyl, or alkoxy also preferably containing up to six carbon atoms, amino, mono- or di-alkylamino, the alkyl groups of which preferably also contain up to six carbon atoms, halogen such as chlorine or bromine, or nitro, nitrile, carboxyl or esterified carboxyl may also be used.

Particular utility is exhibited by the following azido compounds: 9-azidoacridine, 2-chloro-9-azidoacridine, 2-nitro-9-azidoacridine, 4-azidoquinaldine, 3-dimethylamino-9-azidoacri-dine, 4-azido-7dimethyl-aminoquinaldine, 3-nitro-9-azidoacridine, 4-azido-7-nitroquinaldine, 9-azido-2,3-benzoacridine, 4-azido-quinaldine, and 2-methyl-9-azidoacridine.

In principle, compounds which contain at least one CH-acidic group, or primary aromatic amines or their salts are suitable reactants for the azido compounds which are transferred into the image receiving material. These include the following:

I. Compounds with one active methylene group of the following formula:

$$X-CH_2-Y$$

in which

X is a CN or an iminocarbonyl group;

Y is a CN group or a group which has a carbonyl group adjacent to the methylene group, e.g. carboxyl groups or esterified carboxyl groups;

X and Y together form the ring members required to complete a heterocyclic compound which has at least one active methylene group, in particular the ring members required to complete one of the following rings: thioxanthene-S-dioxide or derivatives thereof, rhodanine, thiohydantoin, thiobarbituric acid, barbituric acid, pyrazolone, 5-imino-pyrazoline, pyrazolidine dione-(3,5) or thiooxazolidine dione;

II. Heterocyclic quaternary ammonium salts with active methyl groups, especially in the 2- and/or 4-position as in the following formula:

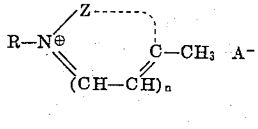

in which

Z represents the ring members necessary for completing one of the following heterocyclic rings: e.g. oxazole, benzoxazole, naphthoxazole, oxazoline, thiazole, benzothiazole, naphthiazole, thiazoline, 4,5,6,7-tetrahydroenzthiazole, selenazole, benzoselenazole, naphthoselenazole, selenazoline, 1,3,4-oxadiazole, 1,3,4-thiadiazole, indole, indoline, or rings of the quinoline series, e.g. lepidine, quinaldine and the like;

R is (1) a saturated or olefinically unsaturated aliphatic group containing up to 18 carbon atoms, e.g. a methyl, butyl, hexyl, dodecyl, heptadecyl or allyl group, the aliphatic radicals may, if desired, be substituted, e.g. with halogen such as chlorine, hydroxyl, sulfo, carboxyl, carbamoyl, sulfonamide and the like; (2) cycloalkyl and in particular cyclohexyl, or (3) aryl groups, preferably a radical of the phenyl series;

*n* is 0 or 1; $A^-$ represents any anion. The nature of the anion is not critical and will depend mainly on the particular method for making the compound. If one of the substituents contains an anionic group, e.g. a sulfonic acid radical, the compound is in the form of a betaine and $A^-$ is not present.

III. Primary aromatic amines, preferably salts, especially those of the benzene or naphthalene series.

The aromatic amines may carry any other additional substituents e.g. alkyl groups preferably containing up to six carbon atoms such as methyl, ethyl, propyl or butyl groups, alkoxy groups also preferably containing up to six carbon atoms, amino, mono- or di-alkyl-amino groups, the alkyl groups of which also preferably containing up to six carbon atoms, halogen atoms such as chlorine or bromine or nitro, nitrile, carboxyl or esterified carboxyl groups.

The following amines and their salts, for example, are suitable: 4-chloroaniline, 2, 3- or 4-sulfoaniline or their alkali metal salts, 4-aminophenol, 4-aminoanisole, benzidine dihydrochloride, flavonic acid, 2-hydroxy-6-aminonapthalene-1,4-disulfonic acid and p-phenylenediamine.

A wide variety of color hues, e.g. yellow, red, blue or even brown etc. can be obtained in the color-forming reaction.

The following summary is given as a more detailed explanation of the colors which can be produced:

| Azide | Reactants in the image-receiving layer | Color hue |
|---|---|---|
| 9-Azido-acridine | 2,3-Dimethylbenzothiazolium- p- toluene sulfonate | blue |
| | 2-methyl-3-n- decylbenzothiazolium- p- toxylate | blue |

| | | |
|---|---|---|
| | 2-methyl-3-ethylbenzothiazolium iodide | blue |
| | 2,3-dimethyl-5-methoxybenzothiazolium-p-toluenesulfonate | blue |
| | 2,3,5-trimethylbenzothiazolium- p-toluenesulfonate | blue |
| 9-Azido-acridine | 2-methyl-3-ethyl-5-hydroxybenzothiazolium- ethyl sulfate | blue green |
| | 2,3-dimethyl-5-carboxymethoxybenzothiazolium- p- toluenesulfonate | blue green |
| | 2,3-dimethyl-6-mercaptobenzothiazolium-methyl sulfonate | blue green |
| | 2,3-dimethyl-6-carboxymethylmercapto-benzothiazolium-p-toluenesulfonate | blue |
| | 2,3-dimethyl-6-nitrobenzothiazolium-p-toluenesulfonate | blue |
| | 2,3-dimethyl-4,5,6,7-tetrahydrobenzo-thiazolium- methyl sulfate | purple |
| | 2,3,5,6-tetramethylbenzoselenazolium-methyl sulfate | green |
| | 2,3-dimethyl-5,6-methylenedihydroxy-benzoselenazolium-p-toluenesulfonate | green |
| | 2,3-dimethyl-α-naphthothiazolium-p-toluene sulfonate | blue-blue green |
| 9-azido-acridine | 2-methyl-3-ethyl-5-hydroxybenzoxazolium ethyl sulfate | purple |
| | 2-methyl-3-ethyl-5-aminosulfonyl-benzoxazolium- ethyl sulfate | purple |
| | 2,3-dimethyl-5nitrobenzoxazolium-p-toluene sulfonate | purple |
| | 2,4-dimethyl-3-ethyl-5carbethoxy-oxazolium-p-toluenesulfonate | purple |
| | 2-methyl-1-ethylquinolinium- p-toluenesulfonate | green |
| | 1,4-dimethylquinolinium- methyl sulfate | green |
| | 2,3,4-trimethylthiazolium- methyl sulfate | red |
| | 2,3-dimethylthiazolium iodide | red |
| | 2,3,5-trimethyl-1,3,4-thiadiazolium iodide | purple |
| | 2-methyl-3-ethyl-5-phenyl-1,3,4-thiadiazolium- ethyl sulfate | blue grey |
| | 1,2,3,3-tetramethyl-5-hydroxy-indoleninium bromide | green |
| | 3-ethylrhodanine | purple |
| | 3-carboxymethylrhodanine | purple |
| | 3-aminorhodanine | violet |
| | 2-thiobarbituric acid | orange red |
| | 1-methyl-3-dodecyl-2-thiobarbituric acid | red |
| | 1,3-diphenyl-2thiobarbituric acid | red |
| | 1,2-di- p- tolylpyrazolidine- 3,5-dione | red |
| | 1,2-bis-4-carbethoxyphenyl- pyrazolidine-3,5-dione | red |
| | 1-methyl-3-hexadecylbarbituric acid | red |
| | 1-phenyl-3-methylpyrazolone- (5) | brownish yellow |
| | 3-ethyl-2-thiooxazolidine- 2,4-dione | orange red |
| | 3,6-diaminothioxanthene- 5-dioxide-dihydrochloride | yellow |
| | 1,5,7-disulfonaphthyl- 3-mehtyl-pyrazolone-(5) | yellow |
| | malonic monoimidic acid diethyl ester hydrochloride | red orange |
| | Malodinitrile | yellow |
| | 4-chloroaniline | yellow |
| | Benzidine-dihydrochloride | yellow |
| | 4-aminophenol | yellow |
| | 4-aminoanisole | yellow |
| | sulfanilic acid | yellow |
| | aniline-2,5-disulfonic acid, Na salt | yellow |
| | Flavonic acid | yellow |
| | 1-4-aminophenyl-3-methylpyrazolone- (5) | orange |
| 4-azido-quinaldine | 2,3-dimethylbenzothiazolium-p-toluenesulfonate | red |
| | 1-methyl-3-allyl-2-thiobarbituric acid | red |
| | 1,2,3,3-tetramethyl-5hydroxy-indoleniniumbromide | green |
| | 1-phenyl-3-methylpyrazolone- (5) | red |
| 2nitro- -9-azido-acridine | 2,3-dimethylbenzothiazolium- p-toluenesulfonate | blue |
| | 1-methyl-3-allyl-2-thiobarbituric acid | red violet |
| | 3-ethylrhodanine | red |
| | 1,2,3,3-tetramethyl-5-hydroxy-indoleninium bromide | green |
| 2-methoxy-6-chloro-9-azido acridine | 2,3-dimethylbenzothiazolium- p-toluenesulfonate | green |
| 2-methyl-9-azidoacridine | 2,3-dimethylbenzothiazolium- p-toluenesulfonate | blue green |
| 3-dimethylamino-9-azidoacridone | 2,3-dimethylbenzothiazolium- p-toluene sulfonate | violet |
| 4-azido-7-nitro quinoline | 2,3-dimethylbenzothiazolium- p-toluene sulfonate | reddish brown |
| 3-phenyl-4-azido-quinaldine | 2,3-dimethylbenzothiazolium- p-toluenesulfonate | purple |
| 9-azido-2,3-benzoacridine | 2,3-dimethylbenzothiazolium- p-toluenesulfonate | blue green |

The light-sensitive azide layers may, of course, contain two or more azides and the image receiving layer two or more reactants, the various mixed colors thus being obtained in the process according to the invention.

The usual natural or synthetic film-forming polymers may be used as binders for the light-sensitive layer, e.g. proteins, especially gelatin, cellulose derivatives, in particular cellulose ethers or carboxymethylcellulose, alginic acid and derivatives thereof, polyvinyl alcohol, polyvinylpyrrolidone, polyvinyl chloride, copolymers of vinyl chloride and vinyl acetate, polyvinyl acetate or completely or partly saponified polyvinyl acetate or copolymers of vinyl acetate, copolymers of acrylonitrile etc. As already mentioned above, the light-sensitive layers may be used as self-supporting layers or applied to a layer support. Suitable layer supports are, for example, paper, especially barytacoated paper or backed paper, cellulose esters, e.g. cellulose triacetate, polyesters, especially those based on ethylene terephthalate, glass, etc.

The light-sensitive azido compounds are contained in the layers in quantities of 0.03 to 1 $g/m^2$. In general this range of concentrations has proved to be suitable although amounts outside this range may, of course, also be employed. The concentration depends mainly on the requirements of the particular reproduction process.

The image receiving material preferably consists of an image receiving layer applied to a suitable layer support. Substantially the same substances as those described above for the light-sensitive material are suitable both for use as binding agent for the image receiving layer and as layer support.

When choosing the binding agents for the light-sensitive layer and the image receiving layer, care should be taken to ensure that the layers will not thick when heated. These difficulties, however, are encountered in other known transfer processes, e.g. the silver salt diffusion process or the various heat development processes, and can be easily solved by using the experience gained in these fields.

As already mentioned above, the image receiving layer may contain reactants capable of reacting with the azido compounds which are transferred to yield colored products. The concentration of these reactants in the image receiving layer may also vary within wide limits. Quantities of 0.1 to 5 $mg/m^2$ have been found satisfactory. In the simplest embodiment of the invention, the image receiving layer does not contain any reactants. In this embodiment the image is rendered visible most simply by uniform after-exposure, preferably with UV-light, the azido compound thus being converted into an azo dye.

The transfer of the light-sensitive azido compounds from the unexposed areas of the light-sensitive layers into the image receiving layer takes place on heating at temperatures of between 80° and 200° C. Heating may be carried out e.g. by moving the exposed light-sensitive layer in contact with the image receiving layer over hot plates or rollers or by uniform irradiation with infra-red light. The most suitable temperature depends, of course, on the azido compound and can be determined by a few simple tests.

The process according to the invention enables colored or black positive line or continuous tone copies, which need not be stabilized or fixed, to be obtained within a very short time under completely dry processing conditions. The process may also be carried out in such a way that several copies are produced from one exposed layer which contains the azido compound. This depends mainly on the concentration of the azido compound in the light-sensitive layer.

Colored images can also be produced by the process of the invention. This can be easily achieved by producing three images in the primary colors more particular in the subtractive primary color. If the three images are placed together in register, a colored diapositive is obtained, or a colored reflecting copy if an opaque support is used.

EXAMPLE 1

Light-sensitive layer:

A casting solution consisting of
1,000 ml. of a 0.5 percent solution of 9-azidoacridine in methanol and
500 ml. of a 1.5 percent solution of a cellulose ether in ethanol is applied to a layer support of paper and the layer is dried.
Application approximately 0.7 g/m².

Image receiving layer:

A casting solution consisting of
300 ml. of a 3.3 percent solution of 2,3-dimethylbenzothiazolium-p-toluene sulfonate in water and
100 ml. of a 1.5 percent solution of a cellulose ether in water is applied to a layer support of baryta-coated paper and dried.
Application approximately 2 g/m².

Processing:

The layer is exposed to a mercury vapor lamp (Osram HQA 400 W) at a distance of 25 cm through a transparent continuous-tone copy for 1 minute. It is run over a hot roller (120° C.) in contact with the image receiving layer. 9-Azidoacridine which has diffused over in the areas of the image reacts immediately when hot with the reactants in the image receiving layer to form a brilliant blue dye. The copy does not need to be stabilized.

EXAMPLE 2

Image receiving layer:

A casting solution of
1,500 ml of a 0.5 percent solution of 4-azido-7-dimethylaminoquinaldine in 2-butanone and
500 ml of a 5 percent solution of polyvinylbutyral in 2-butanone is applied to a layer support of paper and dried.
Application approximately 2 g/m².

Image receiving layer:

A casting solution consisting of
300 ml of a 4 percent solution of 1-[2,4,6-trichlorophenyl]-3-n-decylpyrazolone-5 in ethanol and
100 ml of a 1.5 percent solution of a cellulose ether in ethanol is applied to a layer support of baryta paper and dried.

The light-sensitive layer is exposed as in Example 1 and passed over a hot roller at 120° C. in contact with the image receiving layer as in Example 1. 4-Azido-7-dimethylaminoquinaldine diffuses imagewise from the unexposed areas into the receiving layer and reacts immediately when hot with the pyrazolone derivative in the layer to form a luminous red dye. The finished copy need not be stabilized.

Light-sensitive 4-azido-7-dimethylaminoquinaldine is prepared as follows:

A solution of 2.6 g. (0.04 mol) of sodium axide in 10 ml. of hot water is added dropwise at a temperature of about 70° C. to a solution of 5.6 (0.03 mol) of 4-chloro-7-dimethylaminoquinaldine in 100 ml. of cyclotetramethylenesulfone, and the reaction mixture is then stirred for 2 hours at 70° C. After it has been left to stand overnight, it is poured into 1.5 l of water, and the yellow crystals which separate are dried in vacuo and then recrystallized from light petrol with the addition of active charcoal. Melting point 110° to 112° C.

EXAMPLE 3

Light-sensitive layer:

A casting solution consisting of
500 ml. of a 0.5 percent solution of 9-azido-3-dimethylaminoacridine in butanone-(2) and
500 ml. of a 10 percent solution of polyvinyl chloride in butanone-(2) is applied to a layer support of baryta-coated paper and dried. Application about 3.2 g/m².

Image receiving layer:

A casting solution consisting of
300 ml. of a 4 percent solution of 2,5-dimethyl-3-ethylbenzoselenazolium-p-toluenesulfonate in ethanol and
100 ml. of a 1.5 percent solution of a cellulose ether in ethanol is applied to a layer support of baryta paper and dried. It is exposed for 20 seconds as described in Example 1 and passed over a hot roller at 150° C.— in contact when in contact with the image receiving layer. A green positive image of the original is obtained. The copy need not be stabilized.

Light-sensitive 9-azido-3-dimethylamino-acridine is prepared as follows:

A hot solution of 2 g. (31mmol) of sodium azide in 10 ml. of water is added at 70° C. to a solution of 4 g. (15.5 mmol) of 9-chloro-3-dimethylaminoacridine in 100 ml. of cyclotetramethylenesulfone.

The reaction mixture is stirred for 1 hour at 70° C. and then poured into 1 l of water. The product which separates is removed by suction filtration and washed with water. After it has been dried over $P_2O_5$ in vacuum, it is recrystallized from 400 ml. of light petrol with active charcoal. Melting point 129°–130° C. (decomposition).

EXAMPLE 4

Light-sensitive layer:

A casting solution consisting of
1,000 ml. of a 0.4 percent solution of 9-azido-3-nitro-acridine in butanone-(2) and
500 ml. of a 10 percent solution of a copolymer of vinyl chloride and vinyl acetate in the proportions of 88 : 12 in butanone-(2)
is applied to a baryta-coated paper support and dried.
Application about 2.5 g/m².

Image receiving layer:

A casting solution consisting of 300 ml. of a 4 percent solution of malodinitrile in ethanol and 100 ml. of a 1.5 percent solution of a cellulose ether in ethanol is applied to a layer support of baryta paper and dried.

The light-sensitive layer is exposed as in Example 1. It is run over a hot roller (150° C.) in contact with the image receiving layer. The 9-azido-3-nitroacridine which has not undergone reaction by exposure diffuses imagewise into the receiving layer and immediately reacts at this temperature with the malodinitrile in the layer to form an orange dye. The finished copy need not be stabilized.

Light-sensitive 9-Azido-3-nitro-acridine is prepared as follows:

A stirred suspension of 6.5 g. (0.025 mol) of 9-chloro-3-nitro-acridine and 3.25 g. (0.05 mol) of sodium azide in 200 ml. of dimethylformamide is dipped for 15 minutes into a heating bath heated to 100° C. When the reaction mixture is worked up as described for the preparation of 9-azido-2-nitroacridine, 9-azido-3-nitroacridine is obtained in the form of yellow crystals which deflagrate when rapidly heated. The product is purified by recrystallization from benzene with active charcoal. Melting point: 147° C. (decomposition).

EXAMPLE 5

Light-sensitive layer:

A casting solution consisting of
1,000 ml. of a 0.4 percent solution of 9-azido-2-nitro-acridine in butanone-(2) and
500 ml. of a 10 percent solution of a copolymer of vinyl chloride and vinyl acetate (88 : 12) in butanone-(2) is applied to a layer support of baryta-coated paper and dried.
Application approximately 2.5 g/m².

Image receiving layer:

A casting solution consisting of
300 ml. of a 7 percent solution of 1-methyl-3-hexadecyl-2-thiobarbituric acid in ethanol and
200 ml. of a 1.5 percent solution of a cellulose ether in ethanol is applied to a baryta-coated paper support and dried. Application approximately 2.4 g/m².

After exposure of the azide layer as in Example 1, it is run over a roller heated to 130° C. in contact with the image receiving layer. A brick-red positive image of the original is obtained. The finished copy need not be stabilized.

Light-sensitive 9-azido-2-nitro-acridine is prepared as follows:

A suspension of 6.5 g. (0.025 mol) of 9-chloro-2-nitro acridine and 3.25 g. (0.05 mol) of sodium azide in 200 ml. of dimethylformamide is heated at 100° C. for 15 minutes with stirring. It is then immediately cooled in ice and poured into 1.5 liter of water. The precipitated product is removed by suction filtration and washed with water. After drying in vacuum over phosphorous pentoxide, the product is recrystallized from cyclohexane. Melting point: 135° C. (decomposition).

EXAMPLE 6

Production of a diapositive from the transparent color separation records in the three subtractive primary colors.

A. Cyan partial image:

Image receiving layer:

300 ml. of a 7 percent solution of 2-methyl-3-ethyl-5-hydroxybenzothiazolium ethyl sulfate in water and
200 ml. of a 5 percent solution of polyvinyl alcohol in water are mixed and
applied to a transparent layer support of polyethylene terephthalate and dried. Application: approximately 2.5 g/m.$^2$ Processing: as in Example 1.

After exposure as in Example 1 behind a positive black/white color separation for the cyan partial image, the film is run over a hot roller in contact with the receiving layer, and a transparent, cyan positive continuous-tone image is obtained.

B. Magenta partial image:

Image receiving layer:

300 ml. of a 7 percent solution of 2,3,5-trimethyl-1,3,4-thiadiazolium iodide in water and
200 ml. of a 5 percent solution of polyvinyl alcohol in water are mixed and applied to a transparent layer support of polyethylene terephthalate and dried. Application approximately 2.5 g/m$^2$. A light-sensitive layer is produced as in Example 1. After exposure as in Example 1 behind a positive black/white color separation for the magenta partial image, the layer is run over a hot roller in contact with the image receiving layer, and a transparent magenta positive continuous-tone image is obtained.

Yellow partial image:

Image receiving layer:

300 ml. of a 7 percent solution of sulfanilic acid in water and
200 ml. of a 5 percent solution of in water
are mixed and applied to a transparent layer support of polyethylene terephthalate and dried. Application approximately 2.5 g/m$^2$. A light-sensitive layer is produced as in Example 1. After exposure as in Example 1 behind a positive black/white separation of the yellow partial image, the layer is run over a hot roller in contact with the image receiving layer, and a transparent, yellow positive continuous-tone image is obtained.

If the transparent positive color separation records are registered, a colored diapositive is obtained. A colored diapositive is obtained. A colored reflection image is obtained if the layers are mounted on a white support.

EXAMPLE 7:

A light-sensitive layer is produced and exposed as in Example 1. A baryta-coated paper which does not contain any coupling components is used as image receiving layer. The two layers are run over a roller heated to 110° C. in contact with each other. When the azide has diffused into the receiving layer it is diffusely exposed to U.V. light. A brown positive continuous-tone image is obtained from the azo dye of the acridine. This image need not be stabilized.

We claim:

1. Dry transfer process for the production of positive photographic copies including the steps of a. imagewise exposing to actinic light a light-sensitive layer containing a light-sensitive organic azido compound selected from the group consisting of 9-azidobenzacridines, 9-azidoacridines,4-azidoquinaldines and 4-azidoquinolines, b. heating the exposed layer in contact with an image receiving layer to a temperature of between 80° and 200° C thereby transferring the organic azido compound from the unexposed areas of the light-sensitive layer to the image-receiving layer, and c. converting the imagewise transferred compound into a visible positive image in said image-receiving layer by uniform exposure of the image-receiving layer to actinic light for the azido compound or by a color-forming reaction with a reactant selected from the group consisting of I. Compounds which have an active methylene group and are of the following formula

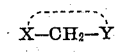

in which

X represents nitrile or an iminocarbonyl group;

Y is CN or a group which has a carbonyl group adjacent to the methylene group;

X and Y may together form the ring members required to complete a heterocyclic compound which has at least one active methylene group;

II. Heterocyclic quaternary salts which have active methyl groups, of the following formula:

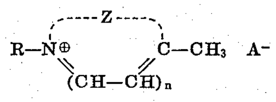

in which:

Z represents the ring members necessary for completing one of the following heterocyclic rings: oxazole, benzoxazole, naphthoxazole, oxazoline, thiazole, benzothiazole, naphthiazole, thiazoline, 4, 5, 6, 7-tetrahydrobenzothiazole, selenazole, benzoselenazole, naphthoselenazole, selenazoline, 1, 3, 4-oxadiazole, 1, 3, 4-thiadiazole, indole, indoline, rings of the quinoline series;

R is a saturated or an olefinically unsaturated aliphatic group having up to 18 carbon atoms, a cycloalkyl or aryl group;

*n* is 0 or 1;

A is any anion; and

III. A benzene or naphthalene group substituted with a primary amino group, or salts thereof said reactant is contained in said image-receiving layer and wherein said reaction occurs during the thermal process step of transferring said organic azido compound to the image receiving layer.

2. The process of claim 1, wherein X and Y stands for the ring members necessary for completing one of the following rings: thioxanthene-S-dioxide, rhodanine, thiohydantoin, thiobarbituric aicd, barbituric acid, pyrazoline, 5-iminopyrazoline, pyrazolidinedione-3,5 or thiooxazolidine dione.

* * * * *